May 15, 1951 W. R. WEEKS 2,553,344
SIDE-BY-SIDE COFFEE MAKER
Filed Oct. 12, 1948

Inventor:
Walter R. Weeks,
by *Sheridan & Bigg*
His Attorney.

Patented May 15, 1951

2,553,344

UNITED STATES PATENT OFFICE 2,553,344

SIDE-BY-SIDE COFFEE MAKER

Walter R. Weeks, Hamden, Conn., assignor to General Electric Company, a corporation of New York Application October 12, 1948, Serial No. 54,113

1 Claim. (Cl. 99—292)

My invention relates to coffee makers and more particularly to a vacuum type of coffee maker having a coffee brewing receptacle and a coffee dispensing receptacle arranged so that the coffee brewing receptacle is by the side of the dispensing receptacle.

In the conventional vacuum type coffee maker in general household use today, the coffee brewing receptacle is mounted above and sealed to the dispensing receptacle by a type of fitted gasket. The dispensing receptacle is filled with water and ground coffee is placed in the upper mixing receptacle. Heat is applied to the lower vessel and the water is forced by the consequent steam pressure up a connecting tube to the upper mixing receptacle where it mixes with the coffee grounds, brewing the coffee. When the heat is removed, a vacuum is produced in the lower vessel and the brewed coffee flows back down through a filter to the lower dispensing receptacle, leaving the used coffee grounds in the filter of the upper receptacle.

It is one of the objects of my invention to improve substantially this system of coffee making by arranging the coffee brewing receptacle beside the coffee dispensing receptacle with an improved connection between both receptacles. By this arrangement I, first, obtain a more stable unit not so easily upset; second, eliminate the necessity for a brewing receptacle specifically shaped to fit the throat of the dispensing receptacle; third, prevent the frequent clogging of the filter and fourth, occasion many other improvements.

In general, my invention comprises a sealed coffee dispensing receptacle having a spout opening into it near the bottom, the mouth of this spout being sealed to a tube extending into an open coffee brewing receptacle positioned beside the dispensing receptacle.

The brewing process in my invention is similar to the conventional vacuum type coffee maker. Heated water is forced through this tube by steam pressure from the dispensing receptacle to the brewing receptacle in which coffee grounds have been previously placed. The coffee is brewed and then returned by vacuumatic action through a filter attached to the bottom of the tube back to the dispensing receptacle. Means are also provided in my invention whereby this dispensing receptacle may then be easily released from its tube connection and used in a manner similar to a conventional coffee pot.

Figure 1:
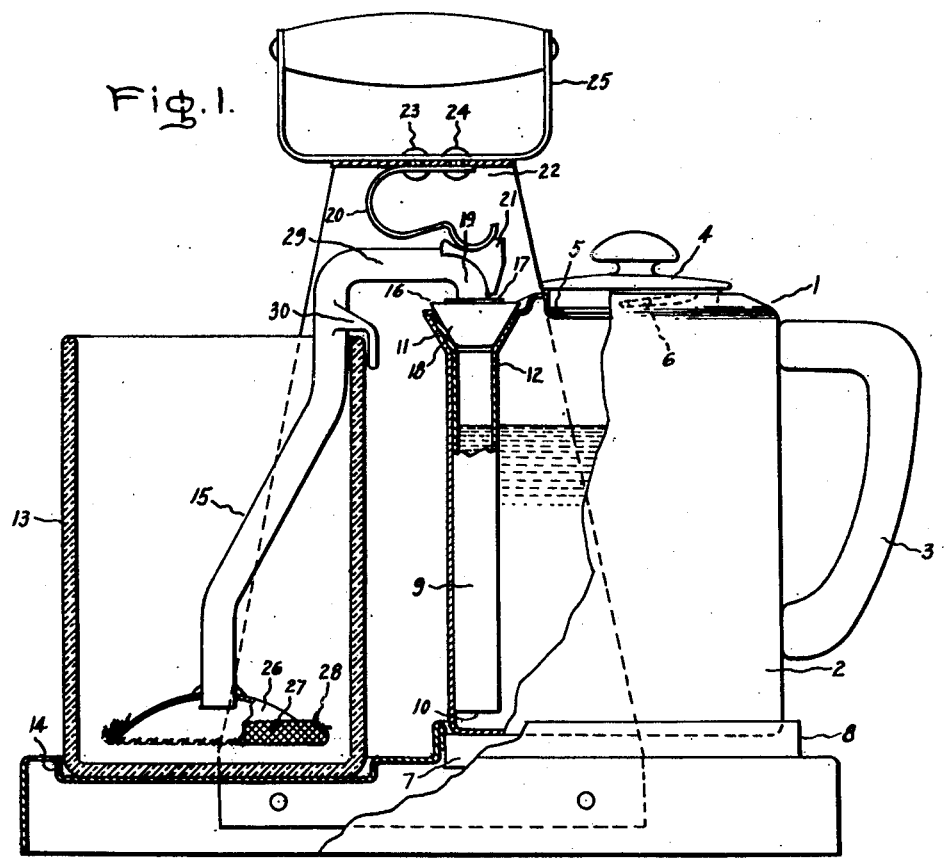
Figure 2:
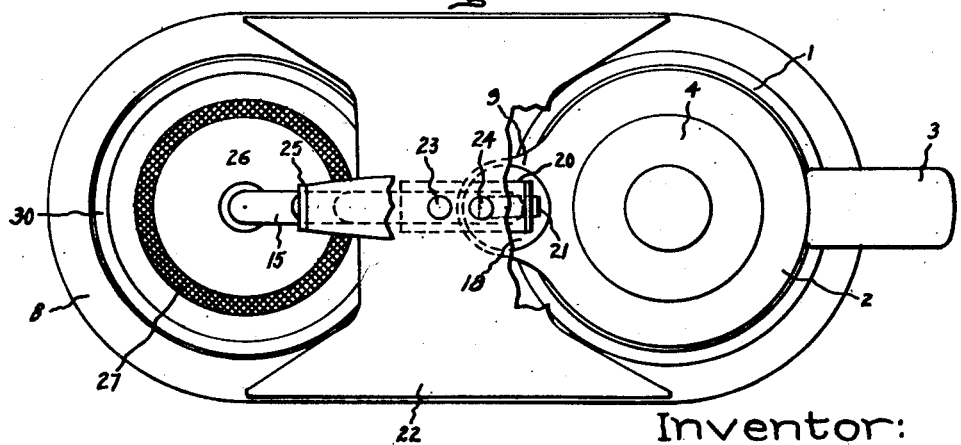

For a more complete understanding of my invention reference should be made to the accompanying drawing in which Fig. 1 is a vertical view, partly in section, of one example of a coffee maker embodying my invention, and Fig. 2 is a plan view of the coffee maker shown in Fig. 1.

Referring to Fig. 1 of the drawing, I have shown my invention in one form as applied to a coffee dispensing vessel or receptacle 1 comprising a liquid container 2, a handle 3, and a suitable cover 4, which can be sealed to the dispensing receptacle 1 so as to form a fluid-tight connection by such means as a gasket 5 and a bayonet clamp 6. An electric heating element 7 may be located in a base 8. A pouring spout 9 of the dispensing vessel 1 projects laterally from the main body of the dispensing vessel 1, and extends its entire height. The spout 9 opens near the bottom into liquid container 2 through an aperture 10, and opens at the top to form a V-shaped pouring mouth 11.

The particular configuration of receptacle 1 as well as the position and shape of spout 9 as described in this preferred embodiment of my invention are not essential to its operation. Any sealed container having a spout opening thereinto near the bottom would serve equally well as long as the spout had a mouth suitably formed to receive a sealing gasket or other means of making a fluid-tight connection to a tube.

Just below the inclined portion of pouring throat 11, located in the inner wall of pouring spout 9 is a small vent 12 which serves both as a brew compensator, as will be more fully explained below, and as an air vent to allow the prepared coffee in the dispensing receptacle 1 to pour easily.

A coffee brewing receptacle 13, mounted beside the dispensing receptacle 1 on the combination base 8 may comprise a simple cast glass or metallic jar having a flat bottom and vertical sides resting securely in a recessed cavity 14 in the base 8 as illustrated in Fig. 1. The particular shape or size of this brewing receptacle is not critical, since practically any type of open vessel will serve the purpose.

Connecting the coffee brewing vessel 13 to the dispensing receptacle 1, is a tube 15, preferably metallic. Tube 15 is sealed at one end to the spout of the dispensing receptacle by a fluid-tight connection in order to produce the proper vacuum within the dispensing receptacle while the coffee is brewing. Many different mechanisms for making this connection may, of course, be employed. In the instant preferred embodiment of my invention, this sealing assembly 16 comprises a metallic washer 17 spun, welded, or otherwise secured to tube 15 and supporting a sealing gasket 18, preferably made of a resilient rubber compound, encircling tube 15 and having a configuration to match the V-shaped mouth 11 of dispensing receptacle 1. This gasket 18 functions like an ordinary stopper making a fluid-tight connection between the mouth 11 of the spout 9 and the upper end 19 of tube 15.

Downward pressure may be applied in order to aid in this sealing process by any suitable means. I have illustrated one such means, best seen in Fig. 1, as comprising an arcuately shaped spring arm 20, which may be fabricated from a resilient metal such as spring steel. Spring arm 20 is seated, at one end, in a socket 21 brazed, welded, or otherwise suitably secured to tube 15 and attached, at the other end, to a supporting arm 22 by such means as rivets 23 and 24. As can best be seen in Fig. 2, supporting arm 22 is secured to base 8 and is vertically arranged to serve also as a support for a carrying handle 25 for the entire unit.

Attached to the lower end of tube 15 and extending close to the bottom of brewing receptacle 13 is a coffee filter, which in one form may comprise a bell shaped filter support 26 on which a filter cloth 27 is mounted and tightened by means of a draw string 28. The tube 15 may assume many different configurations without affecting the operation of the coffee maker. One convenient configuration is in the form of an arch 29 extending between the brewing and the dispensing receptacles. One leg of this arch 29 may be supported on the vertical side of brewing receptacle 13 by a metallic flange 30 secured to tube 15 by such means as welding or brazing.

In the operation of the above-described embodiment of my invention, water is placed in container 2 of dispensing receptacle 1 through cover 4 which is then sealed to the dispensing receptacle 1 by gasket 5 and bayonet clamp 6. The dispensing receptacle 1 is placed on base 8 by lifting tube 15 thereby compressing spring arm 20, sliding the dispensing receptacle 1 under the upper end of tube 15 so that the spout 9 is aligned with the tube 15, and allowing the sealing gasket 18 to seat itself, with the aid of spring arm 20, within the mouth 11 of the spout 9. Ground coffee is then placed in brewing receptacle 13 and the heating element 7 is energized by connection to a suitable electric current source (not shown). As the water heats, the air above the water expands and escapes through small vent 12, acting as a brew compensator in order to prevent the premature transfer of water from the dispensing receptacle to the brewing receptacle. This is especially important when small quantities of coffee are to be made.

When steam is being generated in the container 2 at a rate sufficiently great that it cannot all escape through the small vent 12, the consequent steam pressure forces the water in container 2 through aperture 10, up the spout 9, through connecting tube 15 and into brewing receptacle 13 where it mixes with the ground coffee placed there previously.

When the water in container 2 of the dispensing receptacle 1 has reached a low level, such as the bottom of spout 9, the heating element 7 is turned off and the container 2 begins to cool. When container 2 cools sufficiently, the steam in it condenses, a vacuum results in the container 2 and the brewed coffee in the brewing receptacle 13 is drawn back through filter cloth 27, through connecting tube 15 and into container 2 of dispensing receptacle 1.

When the user desires to pour coffee, he simply grasps dispensing receptacle 1 by its handle 3 and lifts it away from the tube connection. The spring arm 20 is compressed and tube 15 is pitched toward brewing container 13 pivoting on the supporting flange 30 so that little or no coffee will be left in the connection end of tube 15.

As is apparent from the above description, the coffee dispensing receptacle may, in one form, be an ordinary water percolator with an extended spout, easily designed and suitable for many household purposes other than the preparation of coffee. The coffee brewing receptacle, although it may assume almost any desired shape, may be a simple glass or metallic jar, stable, easily cleaned, and also suitable for many other household purposes. Another advantage of my invention is that the entire unit is light and compact and may be easily carried from place to place. A still further advantage is that upon completion of the coffee making cycle the used coffee grounds tend to fall to the bottom of the brewing receptacle 13 rather than cling to filter cloth 27 making it comparatively easy to clean the filter and to dispose of the used coffee grounds.

While I have shown my invention in one form in connection with an electric heating element, other methods for heating the unit may obviously be used. In addition, the entire coffee making cycle can be made completely automatic by use of the automatic thermal control means as taught in my U. S. Patents Nos. 2,287,583, 2,287,584 and 2,287,585, granted June 23, 1942, and assigned to the assignee of this invention.

It will therefore, be understood that I do not wish to be limited to the particular embodiment of my invention I have shown above since many modifications may be made, and I, therefore, contemplate by the appended claim to cover such modifications as fall within the true spirit and scope of my invention.

What I claim as new and desire to secure by Letters Patent of the United States is:

A coffee maker comprising a dispensing vessel having a handle attached thereto and a cover sealable thereto and containing a spout located within said dispensing receptacle having a V-shaped mouth and extending the height of said dispensing vessel, said spout opening into said vessel near the bottom thereof, a brewing receptacle open at the top, a base for supporting said dispensing receptacle and said brewing receptacle, said base having a vertically extending supporting arm attached thereto, a tube supported on the side of said brewing receptacle and extending thereinto, said tube having a filter and holder therefor attached to its lower end within said brewing receptacle and a socket attached to its upper portion, a sealing gasket concentrically surrounding the upper end of said tube and shaped to fit snugly within said V-shaped mouth, and a resilient arm attached to one end of said supporting arm, said resilient arm resting within said socket to facilitate positioning and securing said sealing gasket within said V-shaped mouth, said spout constituting a conduit for fluid transfer into said brewing receptacle and also constituting a pouring means for said dispensing receptacle after disconnection of said tube therefrom.

WALTER R. WEEKS.

REFERENCES CITED

The following references are of record in the file of this patent:

UNITED STATES PATENTS

| Number | Name | Date |
|---|---|---|
| 368,232 | Perdelwitz | Aug. 16, 1887 |
| 449,603 | Thurall | Mar. 31, 1891 |
| 2,097,681 | Wolcott | Nov. 2, 1937 |
| 2,139,881 | Comstock | Dec. 13, 1938 |
| 2,269,112 | Jepson et al. | Jan. 6, 1942 |
| 2,313,112 | Wolcott | Mar. 9, 1943 |
| 2,409,226 | Schlumbohm | Oct. 15, 1946 |

FOREIGN PATENTS

| Number | Country | Date |
|---|---|---|
| 10,594 | France | July 7, 1853 |
| 12,766 | Great Britain | Sept. 13, 1849 |
| 18,413 | Great Britain | A. D. 1890 |
| 116,048 | Great Britain | May 30, 1918 |
| 415,243 | Germany | June 16, 1925 |
| 653,683 | Germany | Feb. 25, 1937 |